Aug. 13, 1968  E. SCHUMACHER  3,396,608
DRIVE CONNECTION

Filed May 21, 1965  2 Sheets-Sheet 1

INVENTOR
ERNST SCHUMACHER

BY *Dicke & Craig*
ATTORNEYS.

United States Patent Office 3,396,608
Patented Aug. 13, 1968

3,396,608
DRIVE CONNECTION
Ernst Schumacher, Mulheim, Speldorf (Ruhr), Germany, assignor to Daimler-Benz Aktiengesellschaft, Stuttgart-Unterturkheim, Germany
Filed May 21, 1965, Ser. No. 457,690
12 Claims. (Cl. 74—688)

ABSTRACT OF THE DISCLOSURE

A drive for auxiliary aggregates or units, especially in internal combustion engines for vehicles, having a coupling between the driving engine and the auxiliary drive driving the auxiliary aggregates, which coupling adjusts itself automatically to an increasing slippage with an increasing engine rotational speed. Preferably, the coupling is a hydrodynamic coupling effective only over a low range of engine speed and connected in parallel with a speed reduction unit effective at engine speeds above the range, with means for switching automatically from one to the other.

Background of the invention

With the known drives for the auxiliary aggregates or units in motor vehicles, the auxiliary aggregates or units are driven by way of a slip clutch or coupling from the driving engine having a variable rotational engine speed in such a manner that by suitable slip formation, the coupling or clutch is effective as slip clutch or coupling and the auxiliary aggregates are driven with an essentially constant speed. This constant rotational driving speed becomes disadvantageous with those auxiliary aggregates or units for which a variable power input is characteristic with a variable rotational speed of the driving engine.

Summary of the invention

For purposes of improving the drive of auxiliary aggregates or units according to the manner described above, the present invention proposes that a drive connection or transmission train is connected in parallel with the transmission train or drive connection containing the coupling which is operable in a speed-reducing manner with respect thereto and that a free-wheeling device is effective between the means producing the speed reduction and the auxiliary drive which, within the regulating or adjusting range of the coupling upon attaining a predetermined slippage in the coupling, operatively connects the auxiliary drive by way of the speed reducing means with the driving engine.

The modern internal combustion engines having, for example, a rotational speed range between 500 and 6500 r.p.m. are equipped with the most different auxiliary aggregates or units such as radiator fan, water pump, alternating current generator, oil pumps, cooling compressor, etc., having input requirements which differ from one another. These auxiliary aggregates or units have to operate already at low engine rotational speeds and, in part, consume unnecessarily power at high engine rotational speeds. According to the present invention, the automatically regulated coupling transmits in the lower engine rotational speed range the required starting torques and has an adjusting or regulating range of, for example 750–2400 r.p.m. whereby an almost constant driving rotational speed is adjusted throughout this range. The rotational speeds of the internal combustion engine lying above the regulating range of the coupling are matched in accordance with the present invention to the differing input powers of fan, water pump, on the one hand, and the constant input requirements of other auxiliary aggregates in that a means connected in parallel with the coupling and producing a speed reduction causes a speed reduction of the aforementioned higher engine rotational speeds at a suitable constant ratio. As a result of such an arrangement, a saving in unnecessary power is advantageously achieved for the drive of the auxiliary aggregates having a constant power input whereby simultaneously therewith an increasing driving rotational speed is available for the drive of the radiator fan, or blower, water pump, etc. having variable power inputs.

According to one embodiment of the present invention, the coupling is a conventional hydrodynamic coupling and the means for producing the speed reduction of a hydrodynamic torque converter whose pump wheel is connected with the primary shell or primary member of the coupling and whose turbine wheel is connected with the secondary shell or secondary member of the coupling while the free-wheeling device acts on the guide wheel of the torque converter which guide wheel also rotates within the adjusting range of the coupling, whereby the blades of the guide wheel are arranged along a smaller central radius than the blades of the coupling. With such an arrangement, the hydrodynamic coupling again transmits the required starting torques at low engine rotational speed whereby toward the end of the adjusting range, the coupling is automatically emptied, as a result of which the guide wheel of the torque converter rests against a stationary housing part and the torque converter produces a speed reduction of the engine rotational speed at nearly constant ratio.

With an installation known in the prior art for matching the cooling air supply to the prevailing requirements of an internal combustion engine, exclusively the fan among the auxiliary aggregates is driven by a coupling automatically adjusting itself with increasing rotational engine speed to an increasing slippage, whose slippage additionally is dependent on the cooling medium temperature.

For the transmission of the brake movement with a pushing output, that is, when the vehicle wheels drive the engine, it is known in connection with a hydrodynamic torque converter for the torque transmission in motor vehicles that the turbine wheel of the torque converter forms or carries the primary member and the pump wheel of the torque converter the secondary member of a hydrodynamic coupling.

With a transmission having a divided power train or split power paths, in which two parallely connected power trains act on a common output shaft and transmits identical power outputs as well as torques, it is known that at least in one of the transmission trains, a clutch or fluid coupling providing slippage is inserted ahead of the pinion driving the spur gear on the output shaft receiving the transmission forces. With these known transmission constructions, a completely uniform power transmission is to be achieved by way of the subdivided power trains if the different trains or paths are not subjected to identical loads or do not become operable completely uniformly.

The arrangements described hereinabove for the force-transmission, however, could not provide any suggestion for the present invention by reason of the different underlying problems and modes of operation.

According to a further feature of the present invention, the means for producing the speed reduction is a conventional planetary gear.

Accordingly, it is an object of the present invention to provide a drive connection for auxiliary aggregates or units in motor vehicles which obviates by extremely simple means the aforementioned shortcomings and drawbacks encountered with the prior art constructions.

Another object of the present invention resides in the provision of a drive connection for the auxiliary units of motor vehicles which achieves a better matching of the engine rotational speeds to the power input requirements of the auxiliary units.

A further object of the present invention resides in the provision of a drive for auxiliary units especially with internal combustion engines, which brings about a saving in the driving or input power used by the auxiliary units.

Still another object of the present invention resides in the provision of a drive for auxiliary units, especially in motor vehicles, which takes into consideration the varying power input requirements of the different units and assures a relatively highly efficient drive connection while at the same time providing a fairly well matched power input to the different auxiliary units over the entire speed range of the engine.

*Brief description of the drawing*

These and other objects, features and advantages of the present invention will become more obvious from the following description when taken in connection with the accompanying drawing which shows, for purposes of illustration only, one embodiment in accordance with the present invention and wherein:

In the diagrams of FIGURES 1 and 2, and more particularly in connection with the curves shown therein, a regulating or adjusting range of the coupling is assumed which comprises, for example, engine rotational speeds of about 750 r.p.m. to 2400 r.p.m. The coupling is thereby gradually emptied with an engine rotational speed of about 750 r.p.m. whereas the output rotational speed of the coupling remains nearly constant up to an engine rotational speed of about 2400 f.p.m. (FIGURE 2) at which the coupling is completely emptied and the torque converter from that point on produces a speed reduction of the engine rotational speed, for exampde, with a ratio of 1:3.

In FIGURE 1 the curve *a* indicates the input power requirements of different auxiliary aggregates of an internal combustion engine such as water pump, fan, generator, oil pumps, spring system, central hydraulic system and servo steering as well as, for example, the compressor of an air conditioning installation. The output N is plotted in FIGURE 1 against engine rotational speed *n*. The curve *b* indicates the output of the internal combustion engine if the latter drives directly the auxiliary aggregates. The configuration of curve *c* characterizes the driving power with a drive of the auxiliary aggregates according to the present invention. The difference between the areas A and B corresponds to the savings in power which is achieved by the present invention as compared to the direct drive of the auxiliary aggregates by the internal combustion engine. The relatively high power input within the regulating range of the coupling which results from a drive according to the curve *c*, is conditioned by the slippage of the coupling so that a relatively high power loss in this adjusting range is opposed to a relatively small power loss outside of this adjusting range of the coupling. By the selection of the adjusting range of the coupling as well as of a suitable ratio of the speed reduction, there exists the possibility by the present invention to be able to match the variable rotational speed of a drive for auxiliary aggregates having different input requirements to the entire power input requirement thereof.

Figure 3:
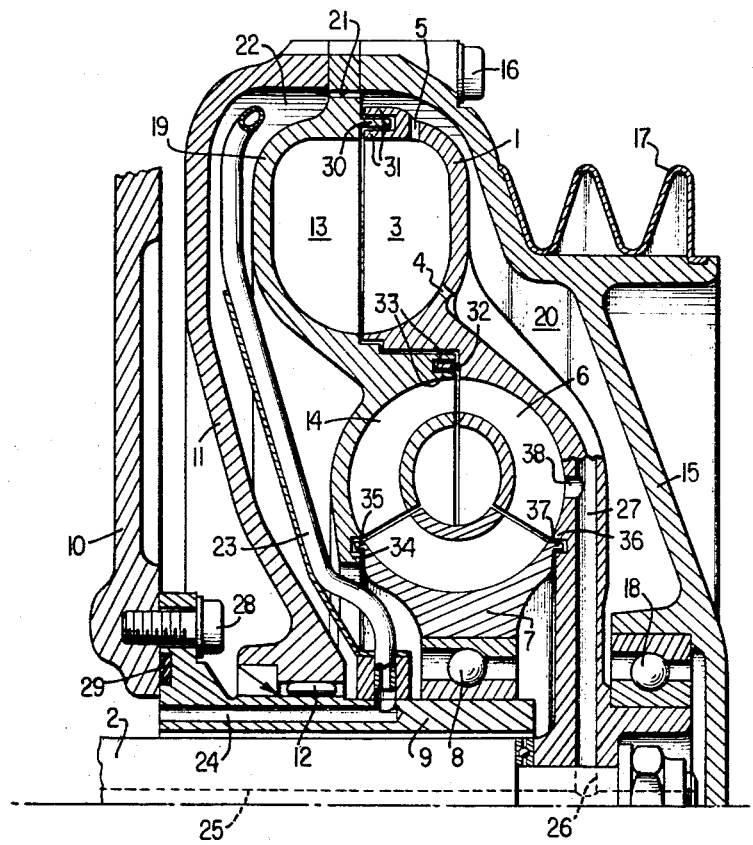
FIGURE 3 is a partial cross sectional view through a drive connection in accordance with the present invention including a hydrodynamic, automatically adjusted coupling with which a hydrodynamic torque converter is connected in parallel.

According to FIGURE 3, the primary member 1 of a hydrodynamic coupling is connected, for example, with the drive shaft 2 of an internal combustion engine (not shown) whereby within the area of the coupling blades 3, housing bores 4 and 5 are provided for the supply and discharge of the coupling liquid. A further blading 6 at the primary member 1, axially offset to the coupling blades 3, forms according to the present invention the pump wheel of a hydrodynamic torque converter whose guide wheel 7 is supported by way of a free-wheeling device 8 on a stationary shaft stub 9 of the engine housing 10 so as to be rotatable in one direction only. A housing part 11 is non-rotatably connected with the secondary part 19 which housing part 11 is rotatably supported on the shaft stub 9 by way of roller bearings 12. The secondary member 19 is provided with a blading 13 corresponding to the coupling blades 3. A further blading 14 of the secondary part 19 forms the turbine wheel of the hydrodynamic torque converter. A housing shell 15 is flangedly connected with the secondary part 19 or with the housing part 11 thereof by means of bolts 16 whereby the external wedge-shaped annular groove configuration 17 forms the drive output and the housing shell 15 is rotatably supported by way of roller bearings 18 on the primary member 1 of the hydrodynamic coupling. The housing shell 15 forms together with the primary shell 1 a space 20 which is in communication by way of bores 21 with a space 22 that is defined essentially by the secondary member 19 and the outer housing part 11. Scoop tubes 23 are arranged within the space 22 which are secured on the shaft stub 9 and are in communication by way of axial bores 24 in the shaft stub 9, for instance, with the oil sump of the internal combustion engine. An axial bore 25 is provided in the drive shaft 2 for the supply of the hydraulic medium in which terminate the radial bores 26 which are in communication with the radial housing channels 27 of the primary member 1. The housing channels 27 terminate by way of bores 4 of the primary member 1 in the interior space of the hydrodynamic coupling and are in communication by way of bores 38 with the interior space of the hydrodynamic torque converter. The shaft stub 9 is secured by means of bolts 28 at the housing 10 of the internal combustion engine and is sealed with respect thereto by means of a seal 29. Housing lips 30 and 31 of the shells or parts 1 and 19 form a labyrinth seal along the external circumference of the primary and secondary parts 1 and 19 within the area of the coupling blades 3 and 13. The interior space of the coupling is also sealed in a labyrinth-like manner with respect to the interior space of the hydrodynamic torque converter by housing lips 32 and 33. The seal of the hydrodynamic torque converter with respect to the space 22 is effected by lip-like housing portions 34, 35 and 36, 37 at the guide wheel 7 and the primary and/or secondary parts 1 and 19, respectively.

*Operation*

The operation of the drive of the type described above for the auxiliary aggregates is as follows:

The annular space of the hydrodynamic torque converter subdivided by the individual wheel blades 6, 14 is filled with a constant quantity of oil. Leakage losses at the sealing places are compensated for by way of bores 38. The liquid spaces formed by the coupling blading 3 and 13 are filled completely with coupling liquid at low rotational speeds of the internal combustion engine. Beginning with a predetermined rotational speed of the engine, for example, 750 r.p.m. according to FIGURE 2, more coupling liquid is scooped off by way of the scoop tubes 23 and the bores 24 by the centrifugal force effect than can be supplied by way of bores 25 and 26 and the housing channels 27 of the coupling as a result of the throttling effect of the bores 4. The slippage conditioned thereby between the engine rotational speed and the driving rotational speed of the auxiliary aggregates increases with increasing engine rotational speed so that the driving rotational speed for the auxiliary aggregates remains nearly constant. After complete emptying of the coupling, for example, in FIGURE 2 at about 2400 r.p.m., the guide wheel 7 of the hydrodynamic torque converter is supported against the housing 10 of the internal combustion engine and the rotational speed is now reduced by the torque converter with a nearly constant ratio.

Figure 2:
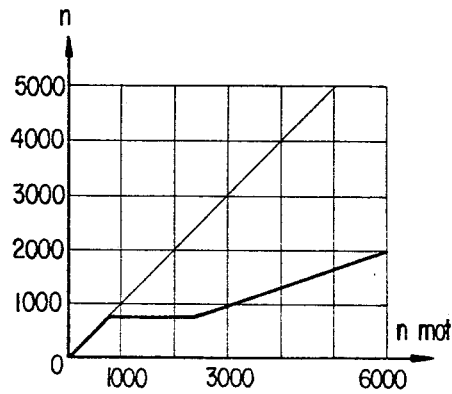
FIGURE 2 is a rotational speed diagram with the use of the present invention in which engine rotational speed is again plotted along the abscissa and rotational speed of the auxiliary drive along the ordinate.
Figure 4:
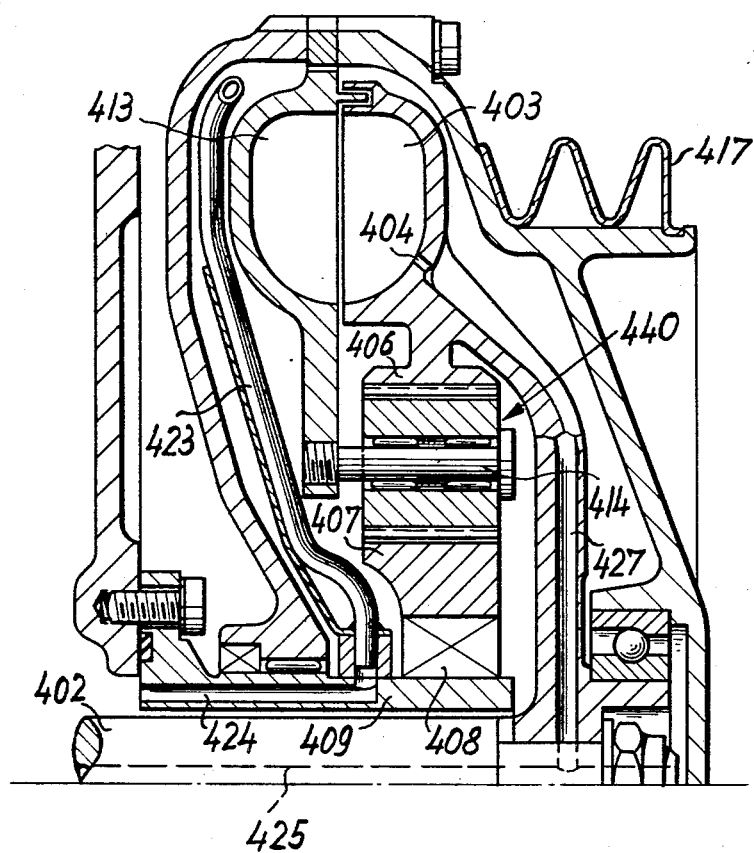
FIGURE 4 is a partial cross sectional view through a drive connection in accordance with the present invention including a hydrodynamic, automatically adjusted coupling connected in parallel with a planetary gear arrangement according to a second embodiment.

As shown in FIGURE 4, two parallel power transmission trains are provided between the primary component or engine shaft 402, driven by the vehicle engine (not shown), and an ouput component (belt pulley or drive output 417). Within the first power transmission train, there is arranged a variable hydrodynamic coupling 403, 413 with its fluid circulation being controlled by feed lines 425, 427, a throttle outlet bore 404, stationary scoop tubes 423, and discharge lines 424. The hydrodynamic coupling is substantially identical to and has the same operation as the hydrodynamic coupling described above in regard to FIGURE 3. As explained in regard to FIGURE 3, the coupling 403, 413 may be varied at increasing impeller speed toward a greater slip by interaction of the scoops 423 and the throttle bore 404 in order to attain a substantially constant turbine speed over the adjusting range of approximately 750 r.p.m. to 2400 r.p.m., as illustrated in FIGURE 2.

Figure 1:
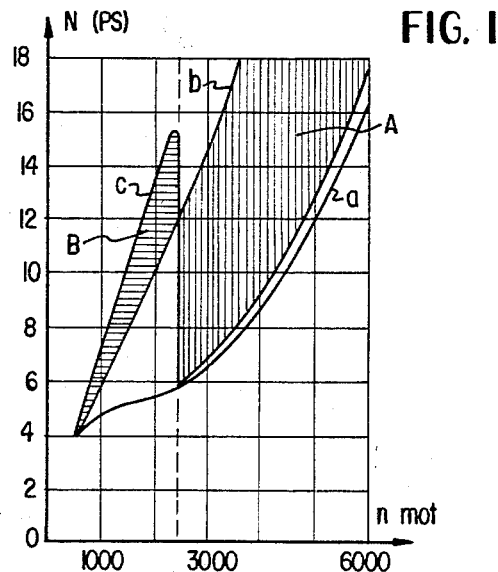
FIGURE 1 is a diagram representing the savings in power, obtained in principle by the present invention, in which engine rotational speed is plotted along the abscissa and power output in horsepower is plotted along the ordinate.

The second and parallel power transmission train between the engine shaft 402 and the output pulley 417 is formed by planetary gear arrangement 440 having an internal bore ring gear 406 fixedly attached to the coupling impeller 403, one or more planet gears 414 drivingly connected with the coupling turbine wheel 413, and a sun gear 407 that is connected through a one-way brake 408 with the fixed housing part 409 for free rotation in the direction of drive and for locking in the opposite direction. In all other respects, the design operation of the drive transmission according to FIGURE 4 is identical with the transmission design and operation shown in FIGURE 3 and the illustrations of FIGURES 1 and 2 apply equally.

While I have shown and described one embodiment in accordance with the present invention, it is understood that the same is not limited thereto but is susceptible of numerous changes and modifications as known to a person skilled in the art. Thus, I do not wish to be limited to the details shown and described herein but intend to cover all such changes and modifications as are encompassed by the scope of the appended claims.

I claim:
1. A drive for auxiliary units of a vehicle with a drive engine for driving the wheels, comprising: first means drivingly connected between the driving engine and the auxiliary units including disengageable means for automatically regulating the auxiliary drive slippage of said first means to an increasing slippage with increasing engine speed over a substantially predetermined low speed range; second means drivingly connected in parallel with said first means between the driving engine and the auxiliary units, said second means being operable to produce a speed reduction with respect to the first means including speed reduction means and free-wheeling means drivingly connecting said speed reduction means between said engine and the auxiliary units only at engine speeds above said low speed range.

2. The combination according to claim 1, wherein said speed reduction means includes a reaction member and said free-wheeling means provides a free-wheeling support for said reaction member within the low speed range and fixedly locks said reaction member at engine speeds above said low speed range.

3. The combination according to claim 2, wherein said first means is a hydrodynamic coupling provided with fluid control means for automatically progressively reducing the coupling filling with increasing engine rotation speed within the low speed range.

4. The combination according to claim 3, wherein said speed reduction means is a planetary gear reduction unit.

5. The combination according to claim 4, wherein said planetary gear reduction unit includes a ring gear member, a sun gear member, planetary gears and a planetary gear carrier; said reaction member being one of said gear members; the other of said gear members being rigidly connected to one of the relatively movable parts of said hydrodynamic coupling; and the other relatively movable part of said hydrodynamic coupling being rigidly connected to said carrier.

6. The combination according to claim 3, wherein said speed reduction means is a hydrodynamic torque converter having a turbine blade member, an impeller blade member and said reaction member; one of said blade members being rigidly connected to one of the relatively movable parts of said hydrodynamic coupling; the other of said blade members being rigidly connected to the other of the movable parts of said hydrodynamic coupling.

7. The combination according to claim 1, wherein said speed reduction means has a substantially fixed speed reduction.

8. The combination according to claim 1, wherein said speed reduction means is a hydrodynamic torque converter.

9. The combination according to claim 1, wherein said speed reduction means is a planetary gear reduction arrangement.

10. The combination according to claim 1, wherein said first means includes a hydrodynamic coupling.

11. The combination according to claim 1, wherein said first means produces a constant auxiliary drive speed throughout the entire low speed range.

12. A drive for auxiliary units, especially in internal combustion engines, comprising:
first connecting means between the driving engine and the auxiliary drive driving the auxiliary aggregates including disengageable means for automatically regulating the slippage of said disengageable means to an increasing slippage with increasing engine rotation speed,
and second means operatively connected in parallel with said first means and operable to produce a speed reduction with respect to the first means including speed reduction means and free-wheeling means operatively connected with said speed reduction means for drivingly connecting, within the adjusting range of said disengageable means and upon attaining a predetermined slippage therein, the auxiliary drive with the driving engine through said speed reduction means,
said disengageable means being formed by hydrodynamic coupling means including a primary member and a secondary member, and said speed reduction means being formed by hydrodynamic torque converter means having pump wheel means operatively connected with the primary member of said coupling means and turbine wheel means operatively connected with the secondary member, guide wheel means, and said free-wheeling means being operatively connected with said guide wheel means, said guide wheel means being provided with blade means arranged at a smaller central radius than the blades of the coupling means.

(References on following page)

References Cited

UNITED STATES PATENTS

| | | | |
|---|---|---|---|
| 2,110,741 | 3/1938 | Seibold | 60—54 |
| 2,326,570 | 8/1943 | Schaefer et al. | 74—688 |
| 2,562,464 | 7/1951 | Jandasek | 60—54 |
| 2,687,195 | 8/1951 | Gleasman | 60—54 |
| 2,696,081 | 12/1954 | Kiep | 60—54 |
| 2,899,844 | 8/1959 | Hattan | 74—688 |
| 2,939,340 | 6/1960 | Moore | 74—731 |
| 2,983,164 | 5/1961 | Herndon et al. | 74—688 |
| 3,041,891 | 7/1962 | Black et al. | 74—688 |
| 3,090,251 | 5/1963 | Snyder | 74—677 |
| 2,771,792 | 11/1956 | Whitney | 74—752 |
| 3,147,359 | 9/1964 | Fisher | 74—731 X |

FRED C. MATTERN, Jr., *Primary Examiner.*

THOMAS C. PERRY, *Assistant Examiner.*